United States Patent [19]

Yuan

[11] Patent Number: 5,792,356

[45] Date of Patent: Aug. 11, 1998

[54] FILTRATION FUNNEL WITH IMPROVED FLOW RATE

[76] Inventor: Kaixu Yuan, 907 Lois Ct., Princeton, N.J. 08540

[21] Appl. No.: 790,161

[22] Filed: Jan. 28, 1997

[51] Int. Cl.[6] .................................................. B01D 29/085
[52] U.S. Cl. ........................ 210/473; 210/474; 210/476; 210/477; 210/481; 210/482
[58] Field of Search ................................ 210/473, 474, 210/476, 477, 481, 482; 422/99, 101

[56] References Cited

U.S. PATENT DOCUMENTS

| | | | |
|---|---|---|---|
| 132,963 | 11/1872 | Heermance | 210/473 |
| 618,996 | 2/1899 | Reidel et al. | 210/474 |
| 956,332 | 4/1910 | Fuller | 210/473 |
| 1,111,249 | 9/1914 | Courtwright | 210/474 |
| 1,612,450 | 12/1926 | Leichtfuss | 210/474 |
| 2,061,119 | 11/1936 | Voigt | 210/474 |
| 3,295,686 | 1/1967 | Krueger | 210/473 |
| 4,231,876 | 11/1980 | Zimmerman et al. | 210/482 |
| 4,832,845 | 5/1989 | Hendretti | 210/477 |
| 5,389,253 | 2/1995 | Cicconi | 210/473 |

*Primary Examiner*—W. L. Walker
*Attorney, Agent, or Firm*—Philip O. Post

[57] ABSTRACT

A funnel for filtering particulate from a liquid with improved filtration flow rate using flow paths through a filtering interface defined by a filter element and orifices predominantly on the wall of a conical inner funnel member. Particulate accumulates at the vertex of the inner funnel member. Filtered liquid passes through a collecting chamber between the inner funnel member and an outer funnel member and discharges through a spout. Filtration through the funnel may be assisted by application of a vacuum suction on the filtered liquid side of the filter element or application of a positive pressure on the unfiltered liquid side of the filter element. The inner and outer funnel members can be easily disassembled for cleaning.

3 Claims, 4 Drawing Sheets

FILTRATION FUNNEL WITH IMPROVED FLOW RATE

BACKGROUND OF THE INVENTION

1. Technical Field

The invention relates to a conical funnel filter apparatus that allows filtration with improved flow rates, particularly when the filtration is accomplished with a vacuum flow.

2. Background Art

Filtration of a liquid is a frequent laboratory process. A general filtering method is the use of a funnel apparatus with a filter medium or element situated in the apparatus. The filter element retains suspended particulate matter as the liquid flows through the filter element. This accumulative retention of particulate matter during a filtration is referred to as loading of the filter element. A bed of particulate will accumulate in and over the filter element during the filtration process. The filter element is eventually loaded with particulate matter to the point that a practical filtration flow rate can not be maintained. Available filter element materials include papers, glass fibers and membranes, with cellulose paper being the most common type. A general purpose conical funnel apparatus consists of a conical chamber with an open base and an orifice at its vertex. The orifice is typically connected to a spout, or stem, that discharges the purified liquid (filtrate) from the funnel in a controlled manner. The spout can also provide a convenient means of connection to other apparatus, such as a filtration flask for holding the filtrate. A filter element, generally a quadrant folded paper, is placed against the inside wall surface of the conical chamber. The pre-filtered liquid is poured into the open conical chamber. Gravity causes the fluid to flow through the filter element and exit the funnel through the spout. Vacuum assisted filtration with the general purpose conical funnel is not practicable since the suction of the vacuum can easily perforate the filter element at the single holed vertex of the funnel.

A more practical funnel filter apparatus is known as a Buchner funnel. The Buchner funnel has a cylindrical chamber with an open base for pouring the pre-filtered liquid into the chamber. The other base of the cylindrical chamber is a circular perforated plate that is sealed around its circumference to the basal edge of the cylindrical chamber. The plate has a plurality of orifices in it to allow the liquid to flow out of the cylindrical chamber. A circular filter element is seated on the perforated plate over all of the orifices in the plate. In operation, the filter element and perforated plate interface is horizontal. A vacuum is generally applied to the Buchner funnel's output spout during filtration to assure that the filter element properly "seals" with the surface of the perforated plate and to enhance flow of the liquid through the filter element by suction. Conversely, the open conical chamber containing the pre-filtered liquid can be sealed and pressurized to achieve the same sealing and flow enhancement effects. The cylindrical chamber is connected to a tapered chamber that narrows to form a spout. Pre-filtered liquid is poured into the open end of the cylindrical chamber. The liquid flows through the filter element, which retains suspended particulate matter. The filtrate flows through the orifices in the plate and discharges through the spout.

A third funnel apparatus, known as a Hirsch funnel, is a hybrid of the general purpose conical funnel filter and the Buchner filter. An open conical chamber is used. A circular perforated plate is sealed around its circumference to the inside wall surface of the conical chamber, above its vertex, in a horizontal orientation. The plate separates the conical chamber into an upper conical chamber containing pre-filtered liquid and a lower conical chamber. Similar to the general purpose conical funnel, the vertex of the lower conical chamber is open and is typically connected to a spout. The plate has a plurality of orifices in it to allow the liquid to flow from the upper to lower conical chambers. A circular filter element is seated on the plate over all of the orifices in the plate. Similar to a Buchner funnel, a vacuum or positive pressure is generally used during a Hirsch funnel filtration for sealing and flow enhancement effects. Pre-filtered liquid is poured into the open end of the upper conical chamber. The liquid flows through the filter element, which retains suspended particulate matter. The filtrate flows through the orifices in the plate to the lower conical chamber and exits the Hirsch funnel through the spout.

Buchner and Hirsch funnels are readily available. Further descriptions of these funnels and their use can be found in references such as *Vogel's Textbook of Practical Organic Chemistry*, 5th ed., Longman Scientific and Technical, 1989, p. 68. ISBN 0-582-46236-3.

Existing filtration funnels have limitations in their ability to sustain a practical liquid flow rate through the filter element. A general purpose conical filtration funnel exhibits a rapidly decreasing flow rate as particulate material, retained by the filter element, builds up at the vertex of the conical funnel chamber. Attempting vacuum assisted flow with a general purpose conical funnel apparatus can easily result in puncture of the filter element as a pressure differential builds up across the filter element at the open vertex of the funnel chamber due to the accumulation of particles.

The Buchner and Hirsch funnels address these drawbacks by spreading out the pre-filtered liquid flow through the filter element over the flat horizontal perforated plate. However, other limitations are introduced in the Buchner and Hirsch funnels. The seating of the filter element on the perforated plate is not always ideal. The filter element must be sized to cover all of the orifices in the plate, but should not exceed the diameter of the plate, since pre-filtered liquid may flow under the edges of the filter element and mix with the filtrate. Additionally, the filter element must properly "seal" with the surface of the perforated plate by maintaining adequate surface tension at the interface defined by the filter element and the surface of the plate so that the pre-filtered liquid does not seep between the filter element and surface of the perforated plate. If this seepage occurs, the pre-filtered fluid flows through the orifices in the plate and mixes with the filtrate. This seepage condition can easily occur when the pre-filtered fluid is not easily absorbed into the material of the filter element. A typical example is when an organic liquid is filtered with a cellulose paper filter element.

Prior to the start of the filtration process, a vacuum can be applied to the exit of the Buchner or Hirsch funnel's spout. The vacuum will tightly seal the filter element to the surface of the perforated plate by suction. However, when the filtration process is started, the initial suction has a tendency to immediately draw particles from the pre-filtered liquid into the filter element with retention concentrated in the flow paths over the holes in perforated plate. This significantly decreases the ability to maintain a practical filtration flow rate through the filter element since the particulate jams the filtration channels defined by the orifices in the perforated plate that are covered by the filter element.

Improvements to existing funnel filtration apparatus have focused on refinements to the Buchner and Hirsch style funnels. For example, there are numerous Buchner style funnels that can be disassembled for convenient cleaning of the components.

To address the limitations identified above and those of other filtration funnels in the art, I took an approach that is considerably different from any in the prior art. In my invention, I position the orifices used for filtration flow in the wall of a conical filtration funnel. A standard filter element is generally used with the funnel. As further explained below, filtration flow occurs primarily in the vertical direction through the interface defined by the filter element and surface of the orifices, rather than in a horizontal direction. I discovered that this change in filter flow orientation results in improved flow characteristics that I further identify below.

The prior art discloses no device similar to my invention. Weise in U.S. Pat. No. 4,850,403 teaches the use of vertical holes in the output spout of a funnel to enhance liquid flow through a funnel apparatus. However, use of the apparatus as a filter device is not disclosed and vertical flow paths through holes in the conical funnel chamber is not addressed.

SUMMARY OF THE INVENTION

Accordingly, it is a primary object of the present invention to provide a simple and efficient funnel apparatus with improved flow rates for filtering suspended particulate matter from a liquid. A conical inner funnel member has an open base for receiving the liquid and a plurality of orifices in its wall. In use, the inner funnel member is oriented so that the orifices in its wall provide a vertical flow path for the liquid poured into it. During filtration, a filter element is usually placed up against the inside wall of the inner funnel member. Suspended particulate matter settles at the vertex of the inner funnel member and filtrate discharges from the inner funnel member through the orifices. An outer funnel member with an open base and an orifice at its vertex is exteriorly oriented and axially aligned with the inner funnel member. The outer funnel member is connected at its basal edge to the inner funnel member, which creates a collecting chamber for the filtrate discharged from the inner funnel member. The filtrate in the chamber accumulates at the vertex of the outer funnel member and discharges from the funnel apparatus by a spout connected at one end to the orifice at the outer funnel member's vertex. A vacuum can be applied at the discharge end of the spout to maintain a practical filter flow rate. Alternatively, a positive pressure can be applied to the open base of the inner funnel member to achieve the same effect. The inner funnel member can also be provided with an orifice at its vertex. The connection between the inner and outer funnel members at their basal edges can be direct or by a separate connecting member. The connection can be non-permanent to facilitate cleaning of the funnel members.

Additional objects, advantages and other useful features of the invention will become apparent to those skilled in this art from the following description, wherein I have shown and described a preferred embodiment of this invention, simply by way of illustration of one of the modes best suited to carrying out the invention. As will be realized, the invention is capable of other and different embodiments, and its several details are capable of modifications in various and obvious aspects, all without departing from the invention. Accordingly, the description is to be regarded as illustrative in nature, and not restrictive. The objects and advantages of the invention may be realized and attained by means of the instrumentalities and combinations particularly pointed out and claimed in the appended claims.

BEST MODE FOR CARRYING OUT THE INVENTION

Figure 1:
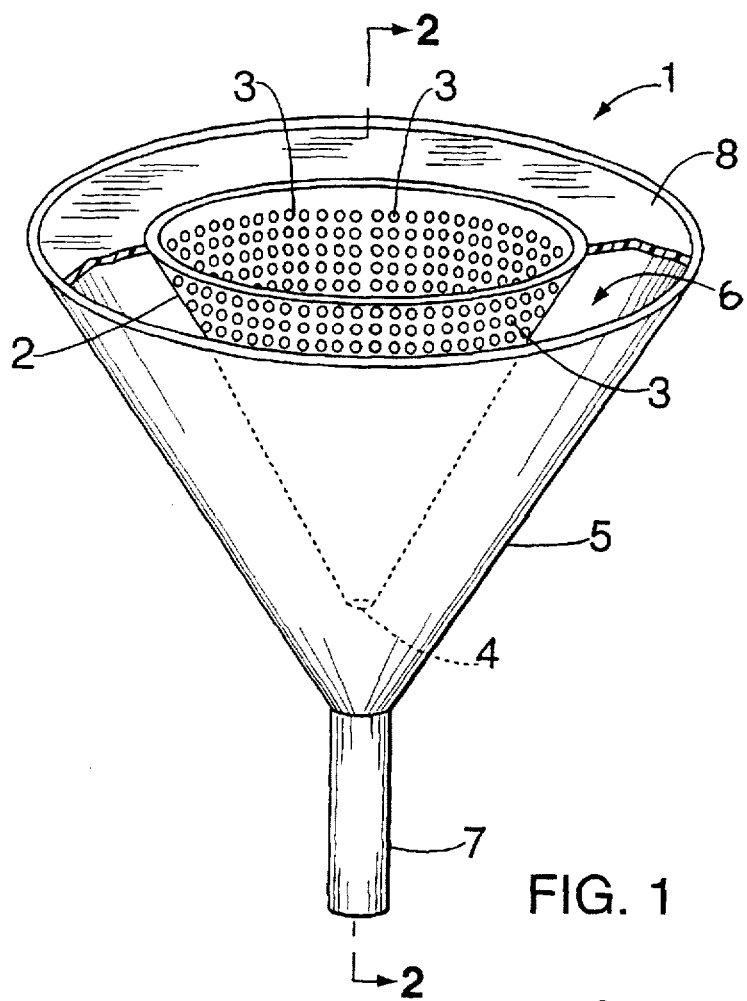
FIG. 1 is an isometric view of the preferred embodiment of the invention.
Figure 2:
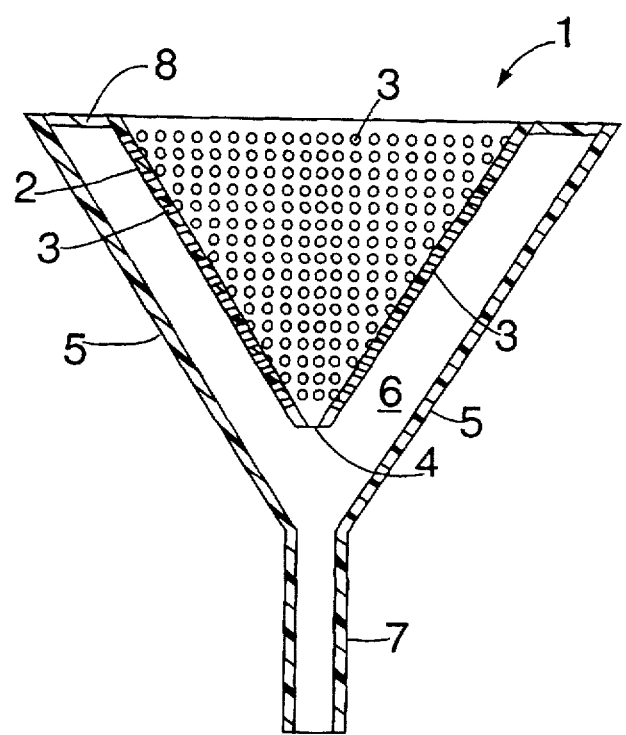
FIG. 2 is a cross-sectional view of the preferred embodiment of the invention.
Figure 3:
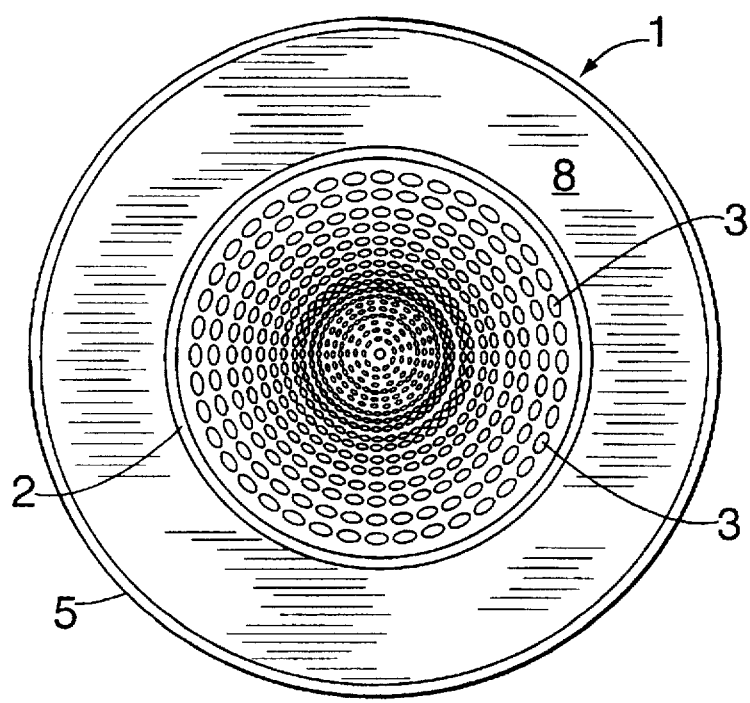
FIG. 3 is a top plan view of the preferred embodiment of the invention.
Figure 4:
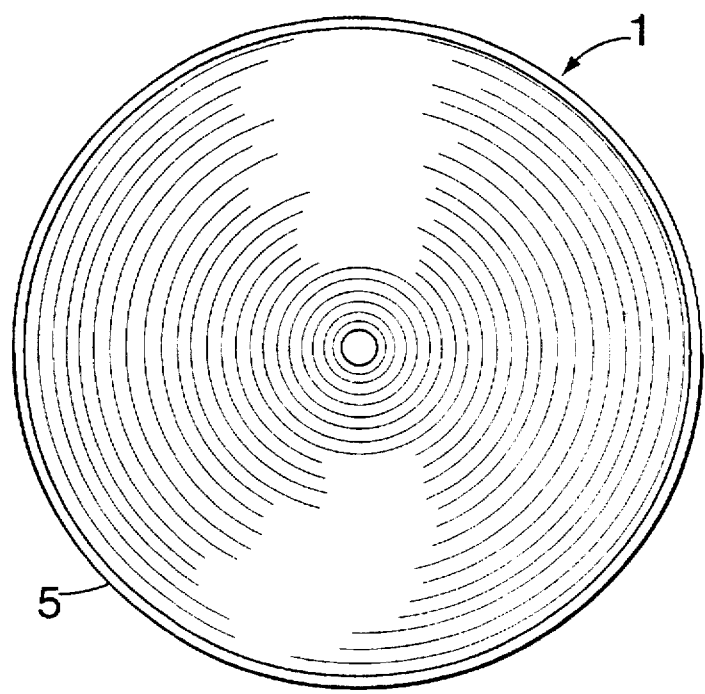
FIG. 4 is a bottom plan view of the preferred embodiment of the invention.

As shown in the drawings and described in this specification, my invention, funnel 1, generally comprises a conical liquid filtering apparatus with predominantly vertical filter flow paths.

Figure 5:
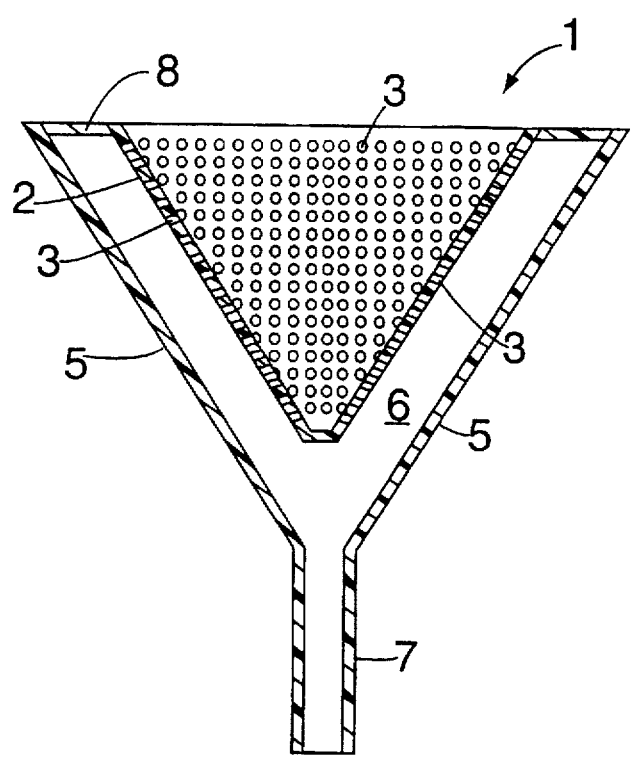
FIG. 5 is a cross-sectional view of an alternative embodiment of the invention.

Referring to the drawings, inner funnel member 2 is the receiving chamber for the pre-filtered liquid. In the preferred embodiment, inner funnel member 2 is substantially a right circular cone with an open base for receiving a liquid. There is a plurality of orifices 3 in the wall of the inner funnel member 2. During filtration, the inner funnel member is oriented so that the orifices 3 provide vertical flow paths for the liquid. In the preferred embodiment of the invention, there is also an orifice 4 at the vertex of the inner funnel member 2. As further explained below, the particulate accumulates at the vertex of inner funnel member 2. The primary purpose of the orifice 4 at the vertex is to permit a flow path for liquid filtering through the particulate buildup at the vertex of the funnel. Generally, it can be of the same size as the orifices in the wall of the inner funnel member 2, or smaller. The quantity, size and locations of the orifices 3 shown in the drawings can vary. One skilled in the art of filtration can determine a configuration of orifices 3 on the basis of the liquid to be filtered and desired flow rates. In an alternative embodiment of the invention, as shown in FIG. 5, there is no orifice at the vertex of the inner funnel member. This embodiment would be preferable where the funnel 1 is used without a filter element. The basal edge of the inner funnel member 2 is connected to the basal edge of the outer funnel member 5 as further explained below.

Figure 6:
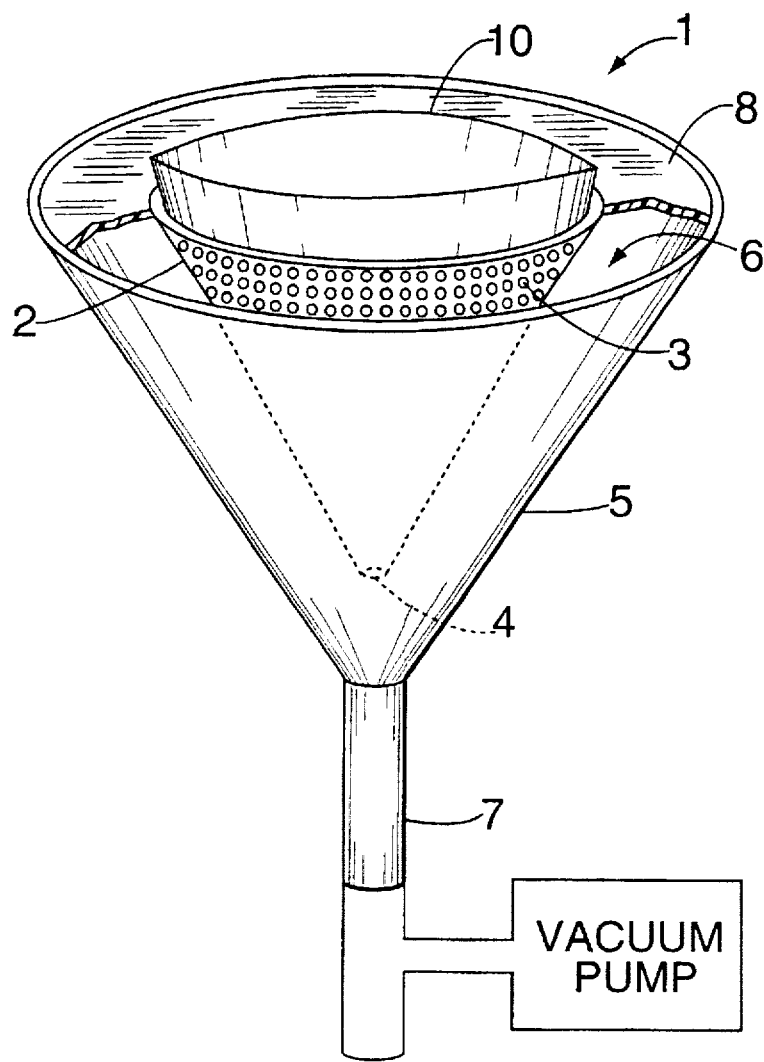
FIG. 6 is an isometric view of the invention shown with a filter element.

Generally, for use of the funnel 1, a readily available quadrant folded circular filter element 10, is seated on the inside perforated wall of the inner funnel member 2 as shown in FIG. 6. For proper filtration, the filter element 10 must cover the surface of the inside wall to at least the maximum height that pre-filtered liquid will be poured into the inner funnel member 2.

The inner funnel member 2 and outer funnel member 5 are connected at their basal edges. The connection can be achieved by direct connection between the two funnel members, or by use of an intermediate connecting member. When the funnel 1 is used with vacuum suction or application of positive pressure, as further explained below, the connection must be airtight. Intermediate connection can be accomplished by the use of an annular spacer 8 as shown in the figures. Annular spacer 8 primarily performs the functions of holding the inner and outer funnel members together at a fixed distance and with a tight seal. Spacer 8 can be permanently connected to the basal edges of the inner funnel member 2 and outer funnel member 5, or it can be non-permanently connected to either or both of the basal edges of the funnel members for ease of disassembly and cleaning of the funnel components. Non-permanent connection can be achieved in various ways, such as making the spacer 8 out of rubber for a pressure fit with the inner and outer funnel members, or providing threaded connections between the spacer 8 and the inner and outer funnel members. It should be understood that in alternative embodiments of the invention, the spacer 8 does not have to be used, and the basal edge of the inner funnel member 2 can be connected directly to the basal edge of the outer funnel member 5.

An outer funnel member 5, exteriorly oriented and axially aligned to the inner funnel member 2, is connected at its basal edge to the spacer 8, as shown in the figures. In the preferred embodiment, outer funnel member 5 is substantially a right circular cone with an open base and an orifice at its vertex. As shown in the figures, the outside wall surface of the inner funnel member 2 and inside wall surface of the outer funnel member 5, in conjunction with the spacer 8, are surfaces that define a filtrate collecting chamber 6. The configuration of collecting chamber 6 can be varied by one skilled in the art of filtration on the basis of the configuration of the orifices 3. Liquid poured into the inner funnel member 2 will pass through the filter element 10 and orifices 3, and then into the collecting chamber 6. Liquid in collecting chamber 6 will accumulate at the vertex of the outer funnel member 5. In the preferred embodiment of the invention, in addition to the flow paths created by the orifices in the wall of the inner funnel member 2, liquid will also flow through the filter element 10 and orifice 4 at the vertex of the inner funnel member 2, and then into the collecting chamber 6. The suspended particulate material in the pre-filtered liquid that is retained by the filter element 10 will migrate to and accumulate at the vertex of the inner funnel member 2, rather than uniformly load the filter element 10 along the height of the wall of the conical inner funnel member 2. This effect results in less jamming of the filtration channels defined by the orifices 3 in the perforated wall that are covered by the filter element. Consequently, a practical filtration flow rate can be sustained for a longer period of time than that for filtration channels defined by equivalent filter elements and horizontal orifice plates.

A important advantage of the invention is that the funnel 1, when sized equivalently in diameter to a Buchner funnel, will provide a significantly greater total filtration area than the Buchner funnel. For example, a typical Buchner funnel has a perforated plate with an inner diameter of 8.2 cm and a total of 127 orifices in the perforated plate. The area of the perforated plate can be calculated as 52.8 cm$^2$. Therefore, the perforated plate has an orifice density of 2.4 orifices per cm$^2$. Using an equivalently sized funnel disclosed by the invention with a right circular conical inner funnel member 2 having a height of 8.2 cm and base inside diameter of 8.2 cm, the area of the perforated wall of the cone can be calculated as 118.5 cm$^2$. Therefore, my funnel has a surface area of filtration that is 2.24 times larger than that for an equivalently sized Buchner funnel. Using the same orifice density as the equivalent Buchner funnel, 2.4 orifices per cm$^2$, my equivalent funnel allows for approximately 284 orifices in the perforated wall of the cone. For an equivalently sized funnel, this allows for a much higher filtration rate. The Kozeny-Carman mathematical relation, which is described in the *Handbook of Filtration*, 1st ed., Eaton-Dikeman Company, 1960, pp. 4-3 and 4—4. SO 8323.317, states that the flow rate through a particulate bed is directly proportional to the area of the particulate bed perpendicular to the direction of flow and inversely proportional to the thickness of the particulate in the direction of the flow. As noted above, in my funnel, the particulate will migrate down to the vertex of the inner funnel member 2. Therefore, the particulate bed does not grow uniformly over the filtration flow area of the inner funnel member 2 perpendicular to the direction of flow, which assists in keeping a practical filtration flow for a longer period of time.

A funnel stem or spout 7, is attached at one end to the orifice at the vertex of the outer funnel member 5. The liquid that collects at the vertex of the outer funnel member 5 will flow into the spout 7 and discharge at the end of the spout 7 opposite the end connected to the outer funnel member 5. The spout 7 is typically placed in a filter flask so that the filtrate can be collected. However, the spout may be connected to other apparatus for further use of the filtrate.

A vacuum can be maintained on the output of spout 7 to assist in maintaining a practical filtration speed and a workable pressure differential across the filter element 10. In general, the vacuum can be applied in a filtration flask that is connected by a vacuum seal to the spout 7. Vacuum suction can then be achieved by connecting a vacuum pump to a side-arm in the flask. Alternatively, a standard joint fitting with a side-arm 20 for connection to a vacuum pump 21 may be connected to spout 7 as shown in FIG. 6.

Conversely, the receiving chamber for the pre-filtered liquid of inner funnel member 2 can be pressurized to force the liquid through the filter element 10, orifices 3 and orifice 4.

The funnel 1, with an appropriate configuration of orifices 3, may be used without a filter element 10 to filter a liquid by gravity separation of particulate matter in the inner funnel member 2. For example, orifices 3 can be limited to the upper wall of inner funnel member 2 with a closed vertex so that particles suspended in the liquid would collect at the vertex of the inner funnel member 2.

In using the preferred embodiment of the invention, a pre-filtered liquid is poured into the inner funnel member 2. The liquid flow path is through the filter element 10, orifices 3 and orifice 4. Particulate matter in the liquid is retained by the filter element 10 and the filtrate flows through the orifices 3 and orifice 4, and then into the collecting chamber 6. The filtrate accumulates at the vertex of the outer funnel member 5 and discharges from the funnel 1 through spout 7.

In summary, I have discovered a simple and efficient conical liquid filter apparatus that provides an improved filtration flow rate by allowing less particulate matter retention over the entire expanded surface filtering interface defined by the filter element and filter orifices.

I claim:

1. Apparatus for filtering particulate from a liquid comprising:

a substantially conical inner funnel member having an open base for receiving the liquid, a plurality of orifices in its wall and an orifice at its vertex;

a substantially conical outer funnel member having an open base and an orifice at its vertex, and being exteriorly oriented to and axially aligned with the inner funnel member;

a means for sealingly connecting the basal edge of the outer funnel member to the basal edge of the inner funnel member, whereby an airtight liquid collecting chamber is formed between the inner funnel member and the outer funnel member;

a spout connected at one end to the orifice at the vertex of the outer funnel member for discharge of the liquid at the end opposite the end connected to the orifice;

means for applying a vacuum at the end of the spout opposite the end connected to the orifice.

2. The apparatus of claim 1 wherein the means for connecting the basal edge of the outer funnel member to the basal edge of the inner funnel is an annular spacer, sealingly connected at its outside diameter to the basal edge of the outer funnel member and sealingly connected at its inside diameter to the basal edge of the inner funnel member.

3. The apparatus of claim 1 wherein the means for sealingly connecting the basal edge of the outer funnel member to the basal edge of the inner funnel member allows disassembly of the inner and outer funnel members.

* * * * *